United States Patent
Hatta (10) Patent No.: US 9,962,886 B2
(45) Date of Patent: May 8, 2018

(54) FILAMENT WINDING APPARATUS AND METHOD OF CONTROLLING FILAMENT WINDING APPARATUS

(71) Applicant: TOYOTA JIDOSHA KABUSHIKI KAISHA, Toyota-shi, Aichi-ken (JP)

(72) Inventor: Ken Hatta, Okazaki (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 15 days.

(21) Appl. No.: 15/052,100

(22) Filed: Feb. 24, 2016

(65) Prior Publication Data
US 2016/0264375 A1  Sep. 15, 2016

(30) Foreign Application Priority Data
Mar. 10, 2015 (JP) ................................. 2015-047059

(51) Int. Cl.
| | | |
|---|---|---|
| B29C 70/32 | (2006.01) | |
| B65H 57/16 | (2006.01) | |
| B65H 57/14 | (2006.01) | |
| B29C 53/62 | (2006.01) | |
| B29K 63/00 | (2006.01) | |
| B29K 307/04 | (2006.01) | |
| B29L 31/00 | (2006.01) | |

(52) U.S. Cl.
CPC .............. *B29C 70/32* (2013.01); *B29C 53/62* (2013.01); *B65H 57/14* (2013.01); *B65H 57/16* (2013.01); *B29K 2063/00* (2013.01); *B29K 2307/04* (2013.01); *B29L 2031/7156* (2013.01); *B65H 2406/331* (2013.01); *B65H 2701/38* (2013.01)

(58) Field of Classification Search
CPC ...... B65H 51/015; B65H 57/14; B65H 57/16; B65H 2406/331; B65H 2701/38; B29C 70/32; B29C 53/62; B29L 2031/7156; B29K 2307/04; B29K 2063/00
See application file for complete search history.

(56) References Cited

U.S. PATENT DOCUMENTS

| | | | | |
|---|---|---|---|---|
| 4,998,658 A | * | 3/1991 | Distefano | .............. B65H 20/12 |
| | | | | 226/95 |
| 2010/0164135 A1 | * | 7/2010 | Otoshi | ................ B29C 47/0021 |
| | | | | 264/177.19 |
| 2015/0224720 A1 | | 8/2015 | Hatta et al. | |

FOREIGN PATENT DOCUMENTS

| | | | |
|---|---|---|---|
| DE | 2060 261 A1 | 6/1971 | |
| DE | 91549 A1 | 7/1972 | |

(Continued)

*Primary Examiner* — William E Dondero
(74) *Attorney, Agent, or Firm* — Finnegan, Henderson, Farabow, Garrett & Dunner, LLP (57) ABSTRACT

An object is to control the position of a fiber bundle on a roller of a guide assembly in a filament winding apparatus. There is provided a filament winding apparatus that winds a fiber bundle consisting of a plurality of fibers on an outer surface of a liner and comprises a fiber feeder configured to feed the fiber bundle; and a guide assembly including a roller configured to guide the fiber bundle fed by the fiber feeder to the outer surface of the liner while making the fiber bundle in contact with the roller. The roller comprises a suction hole configured to suck the outside air and is provided in at least a surface of the roller that is to be in contact with the fiber bundle; and a suction unit configured to suck the outside air from the suction hole with such a suction force that draws the fiber bundle in contact with the roller.

9 Claims, 6 Drawing Sheets

(56) References Cited

FOREIGN PATENT DOCUMENTS

| | | |
|---|---|---|
| DE | 11 2013 004 826 T6 | 8/2015 |
| EP | 2 090 423 A1 | 8/2009 |
| JP | 2011-93276 | 5/2011 |
| JP | 2011-093276 A | 5/2011 |
| JP | 2015-553 | 1/2015 |
| WO | WO 2014/054266 A1 | 4/2014 |

* cited by examiner

|  |  | SECOND ROLLER | | | THIRD ROLLER (SUCTION) |
|---|---|---|---|---|---|
|  |  | AREA AE1 (SUCTION) | AREA AC (EJECTION) | AREA AE2 (SUCTION) | |
| HOOP WINDING | LOCALIZATION IN AREA AE1 | ON | ON | OFF | OFF |
|  | LOCALIZATION IN AREA AE2 | OFF | ON | ON | OFF |
|  | LOCALIZATION IN BOTH AREAS AE1 AND AE2 | ON | ON | ON | OFF |
|  | NO LOCALIZATION | OFF | ON | OFF | OFF |
| HELICAL WINDING | LOCALIZATION IN AREA AE1 | ON | ON | OFF | ON |
|  | LOCALIZATION IN AREA AE2 | OFF | ON | ON | ON |
|  | LOCALIZATION IN BOTH AREAS AE1 AND AE2 | ON | ON | ON | ON |
|  | NO LOCALIZATION | OFF | ON | OFF | ON |

FILAMENT WINDING APPARATUS AND METHOD OF CONTROLLING FILAMENT WINDING APPARATUS

CROSS-REFERENCE TO RELATED APPLICATIONS

The present application claims priority from Japanese patent application P2015-047059 filed on Mar. 10, 2015, the content of which is hereby incorporated by reference into this application.

BACKGROUND

Field

The present invention relates to a filament winding apparatus.

Related Art

The filament winding method is a conventionally known method of manufacturing a high pressure tank. The filament winding method winds fibers impregnated with a thermosetting resin (hereinafter may be simply called "fibers") on a liner that is a core of a high pressure tank and cures the thermosetting resin of the fibers to manufacture the high pressure tank. A high pressure tank with a fiber-reinforced resin layer of the high intensity formed on a surface layer of a liner is manufactured by the filament winding method.

A filament winding apparatus of winding a fiber bundle consisting of a plurality of fibers on a liner is used in manufacture of the high pressure tank by the filament winding method. The filament winding apparatus expands the width of the fiber bundle or converges the fiber bundle on a roller of a guide assembly configured to guide the fiber bundle to the outer surface of the liner and sets the position of the fiber bundle on the roller to an adequate position to wind the fiber bundle on the liner. The filament winding apparatus winds the fiber bundle according to a program that controls the move of the guide assembly and the rotation and the actuation of the liner, so as to form a high pressure tank in a designed configuration. JP 2011-093276A describes a technique that deforms a feed fiber width adjustment roller according to the width of a fiber bundle in the process of guiding the fiber bundle to the outer surface of a liner, so as to expand the width of the fiber bundle or converge the fiber bundle.

The technique described in JP 2011-093276A can expand the width of the fiber bundle or converge the fiber bundle but has not taken into account controlling the position of the fiber bundle on the roller. Similarly the techniques described in JP 2015-000553A and WO 2014-054266A1 have not taken into account controlling the position of the fiber bundle on the roller. In the case where the position of the fiber bundle on the roller is deviated from an adequate location, there is a likelihood that the high pressure tank is not formed in the designed configuration even when the filament winding apparatus drives the guide assembly and the liner to wind the fiber bundle according to a predetermined program.

Thus, techniques which can control the position of the fiber bundle on the roller of the guide assembly in the filament winding apparatus are desired.

SUMMARY

In order to solve at least part of the above problems, the invention may be implemented by any of the following aspects.

(1) According to one aspect of the invention, there is provided a filament winding apparatus that winds a fiber bundle consisting of a plurality of fibers on an outer surface of a liner. The filament winding apparatus comprises a fiber feeder configured to feed the fiber bundle; and a guide assembly including a roller configured to guide the fiber bundle fed by the fiber feeder to the outer surface of the liner while making the fiber bundle in contact with the roller. The roller comprises a suction hole configured to suck the outside air and is provided in at least a surface of the roller that is to be in contact with the fiber bundle; and a suction unit configured to suck the outside air from the suction hole with such a suction force that draws the fiber bundle in contact with the roller.

In the filament winding apparatus of this aspect, the roller provided to guide the fiber bundle to the outer surface of the liner is configured to suck the air from the suction hole provided in the surface of the roller that is in contact with the fiber bundle, with such a suction force that draws the fiber bundle in contact with the roller. Drawing the fiber bundle in contact with the roller toward the roller suppresses the occurrence of a positional misalignment of the fiber bundle, while keeping the position of the fiber bundle. As a result, the filament winding apparatus of this aspect can control the position of the fiber bundle on the roller of the guide assembly.

(2) In the filament winding apparatus of the above aspect, the roller may further comprise an ejection hole configured to eject the air and is provided in at least a surface of the roller that is in contact with the fiber bundle; and an ejection unit configured to eject the air from the ejection hole with such an ejection force that spreads each of the fibers that are included in the fiber bundle in contact with the roller, in a width direction of the roller.

In the filament winding apparatus of this aspect, the roller is also configured to eject the air from the ejection hole provided in the surface of the roller that is in contact with the fiber bundle, with such an ejection force that spreads each of the fibers included in the fiber bundle in contact with the roller, in the width direction of the roller. The roller may thus serve as "expansion roller" that expands the width of the fiber bundle guided to the outer surface of the liner. As a result, the filament winding apparatus of this aspect can expand the width of the fiber bundle guided to the outer surface of the liner while controlling the position of the fiber bundle on the roller of the guide assembly.

(3) In the filament winding apparatus of the above aspect, the suction unit may change at least one of determination of whether suction is to be performed and magnitude of the suction force according to a misalignment of the fiber bundle relative to a predetermined position.

In the filament winding apparatus of this aspect, the suction unit changes at least one of determination of whether suction is to be performed and the magnitude of the suction force according to the misalignment of the fiber bundle. In the case where the fiber bundle has no misalignment, the suction unit may not perform suction or may reduce the magnitude of the suction force. In the case where the fiber bundle has a significant misalignment, on the other hand, the suction unit may perform suction or may increase the magnitude of the suction force. As a result, the filament winding apparatus of this aspect can control the position of the fiber bundle on the roller of the guide assembly according to the misalignment of the fiber bundle.

(4) In the filament winding apparatus of the above aspect, the suction hole may include a first suction hole and a second suction hole. The ejection hole may be placed in a middle part of the roller in a width direction of the roller. The first suction hole and the second suction hole may be placed on both ends of the ejection hole.

In the filament winding apparatus of this aspect, the width of the fiber bundle guided to the outer surface of the liner may be expanded by the air ejected from the ejection hole in the middle part of the roller in the width direction of the roller. The position of the fiber bundle on the roller of the guide assembly may be controlled by the outside air sucked from the first suction hole and the second suction hole in respective end parts of the roller in the width direction of the roller. As a result, the filament winding apparatus of this aspect can effectively use the width of the roller to achieve both the control of the position of the fiber bundle and the expansion of the width of the fiber bundle.

(5) In the filament winding apparatus of the above aspect, the suction unit may perform suction from the first suction hole or the second suction hole corresponding to a location where the fiber bundle has a misalignment or, may increase the suction force from the first suction hole or the second suction hole corresponding to the location where the fiber bundle has the misalignment.

In the filament winding apparatus of this aspect, the suction unit changes at least one of determination of whether suction is to be performed and the magnitude of the suction force with respect to the suction hole corresponding to the location where the fiber bundle has the misalignment. The suction unit may not perform suction or may reduce the magnitude of the suction force with respect to the suction hole that does not corresponding to the location where the fiber bundle has a misalignment. The suction unit may perform suction or may increase the magnitude of the suction force with respect to the suction hole that corresponds to the location where the fiber bundle has a misalignment. As a result, the filament winding apparatus of this aspect can control the position of the fiber bundle on the roller of the guide assembly according to the location where the fiber bundle has a misalignment.

(6) In the filament winding apparatus of the above aspect, the roller may be in a concave shape having a reduced-diameter middle part of the roller in a width direction of the roller. The suction hole may be placed in the middle part of the roller.

In the filament winding apparatus of this aspect, the roller is in the concave shape having the reduced-diameter middle part. The roller may thus serve as "position control roller" that converges the fiber bundle guided to the outer surface of the liner in the middle part. The roller has the suction hole arranged in the middle part to suck the outside air. Drawing the fiber bundle converged in the middle part toward the roller suppresses the occurrence of a positional misalignment of the fiber bundle, while keeping the position of the fiber bundle in the middle part of the roller. As a result, the filament winding apparatus of this aspect can converge the fiber bundle guided to the outer surface of the liner while controlling the position of the fiber bundle on the roller of the guide assembly.

(7) In the filament winding apparatus of the above aspect, the suction unit may change at least one of determination of whether suction is to be performed and magnitude of the suction hole according to a winding technique of the fiber bundle on the liner.

In the filament winding apparatus of this aspect, the suction unit changes at least one of determination of whether suction is to be performed and the magnitude of the suction force according to the winding technique of the fiber bundle on the liner. In the case of hoop winding that is unlikely to cause a misalignment of the fiber bundle, the suction unit may not perform suction or may reduce the magnitude of the suction force. In the case of helical winding that is likely to cause a misalignment of the fiber bundle, on the other hand, the suction unit may perform suction or may increase the magnitude of the suction force. As a result, the filament winding apparatus of this aspect can control the position of the fiber bundle on the roller of the guide assembly according to the winding technique of the fiber bundle.

(8) In the filament winding apparatus of the above aspect comprising the roller in the concave shape, the suction unit may change at least one of determination of whether suction is to be performed and magnitude of the suction force according to a misalignment of the fiber bundle relative to a predetermined position.

In the filament winding apparatus of this aspect, the suction unit changes at least one of determination of whether suction is to be performed and the magnitude of the suction force according to the misalignment of the fiber bundle. In the case where the fiber bundle has no misalignment, the suction unit may not perform suction or may reduce the magnitude of the suction force. In the case where the fiber bundle has a significant misalignment, on the other hand, the suction unit may perform suction or may increase the magnitude of the suction force. As a result, the filament winding apparatus of this aspect can control the position of the fiber bundle on the roller of the guide assembly according to the misalignment of the fiber bundle.

(9) In the filament winding apparatus of the above aspect, the roller may be made of a porous material. The suction hole may be pores of the porous material.

The roller guides the fibers impregnated with a thermosetting resin, while making the resin-impregnated fibers in contact with the roller. The suction hole of the roller is thus likely to be clogged by the thermosetting resin. In the filament winding apparatus of this aspect, the suction hole of the roller is the pores of the porous material. This configuration suppresses the suction hole from being clogged by the thermosetting resin.

The invention may be implemented by any of various aspects other than those described above. The invention may be implemented by, for example, a filament winding apparatus, a filament winding system, a high pressure tank manufacturing apparatus utilizing a filament winding method, a high pressure tank manufacturing system, control methods of these apparatuses or systems, computer programs for implementing such control methods and non-transitory storage media in which such computer programs are stored. The filament winding apparatus according to one aspect of the invention aims to control the position of a fiber bundle on a roller of a guide assembly. Other needs with regard to this filament winding apparatus include downsizing, improvement of usability and energy saving. A manufacturing method using this filament winding apparatus also has other needs including reduction of the manufacturing cost, reduction of the number of manufacturing steps, simplification of the manufacturing method, standardization of the manufacturing method and resource saving.

DESCRIPTION OF THE EMBODIMENTS

A. First Embodiment

A-1. Configuration of Filament Winding Apparatus

Figure 1:
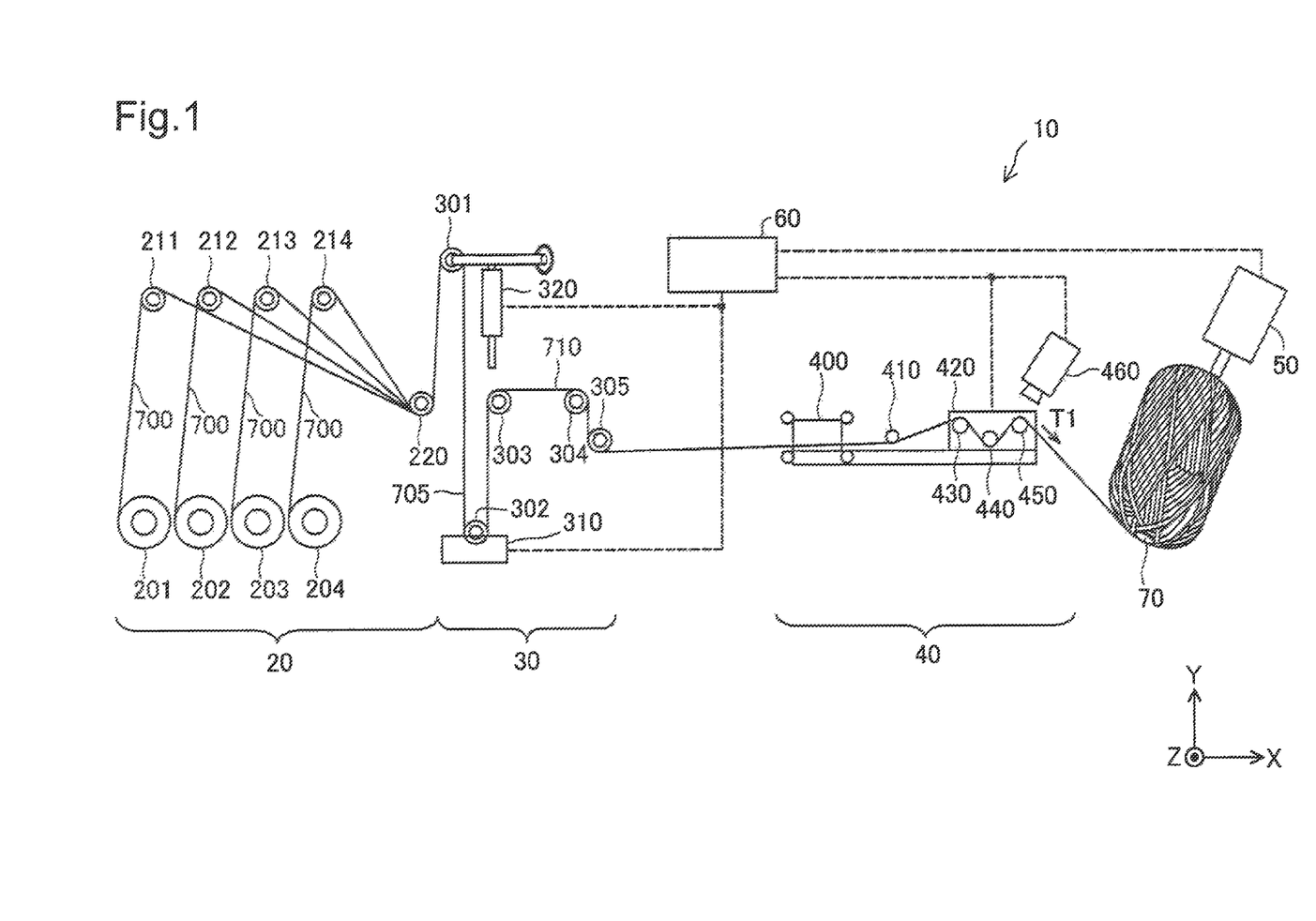
FIG. 1 is a diagram illustrating the configuration of a filament winding apparatus according to one embodiment of the invention.

FIG. 1 is a diagram illustrating the configuration of a filament winding apparatus 10 according to one embodiment of the invention. The filament winding apparatus 10 is configured to wind a fiber bundle consisting of a plurality of fibers on a liner 70 that is the core of a high pressure tank in a method of manufacturing the high pressure tank by filament winding method. The description of FIG. 1 and subsequent drawings is on the assumption that the conveying direction of the fiber bundle is X-axis direction, the height direction is Y-axis direction and the width direction of various rollers to convey fibers is Z-axis direction.

The filament winding apparatus 10 includes a fiber feeder 20, a resin impregnation assembly 30, a guide assembly 40, a liner rotating device 50 and a controller 60. In the filament winding apparatus 10 of this embodiment, rollers of the guide assembly 40 are configured as described later to control the positions of the fiber bundle on the rollers of the guide assembly 40 (in other words, the position of the fiber bundle guided to the outer surface of the liner 70). The guide assembly 40 is also called fiber bundle guide assembly.

The fiber feeder 20 is configured to feed the fiber bundle toward the liner 70. The fiber feeder 20 includes four bobbins 201 to 204, a corresponding number of feed rollers 211 to 214 corresponding to the number of bobbins, and a bundle roller 220. The bobbins 201 to 204 are tubular members configured to hold carbon fibers 700 in the wound state. The carbon fiber 700 may be provided as a flat sheet of about 200 μm in thickness and about 4 mm to 5 mm in width by twisting approximately 24,000 yarns that are obtained by firing original yarns of, for example, polyacrylonitrile at about 3000° C., and lightly bonding the twisted yarns with a binder resin. The feed rollers 211 to 214 are provided corresponding to the respective bobbins 201 to 204. The feed rollers 211 to 214 are configured to feed the respective carbon fibers 700 drawn out of the bobbins 201 to 204 to the bundle roller 220. The bundle roller 220 aligns the plurality of carbon fibers 700 drawn out of the bobbins 201 to 204 to provide a fiber bundle (hereinafter also called "fiber bundle 705") and feeds the fiber bundle 705 to the resin impregnation assembly 30.

The resin impregnation assembly 30 serves to impregnate the fiber bundle 705 with an epoxy resin. The resin impregnation assembly 30 includes five feed rollers 301 to 305, a resin impregnation tank 310 and a film thickness measurement device 320. The feed rollers 301 to 305 are configured to feed the fiber bundle 705 to the guide assembly 40 described later. The resin impregnation tank 310 contains a thermosetting epoxy resin in the liquid form. The thermosetting epoxy resin is heated in the range of 40° C. to 50° C. and is under viscosity control. The fiber bundle 705 is conveyed below the feed roller 302 and is soaked in the thermosetting epoxy resin in the resin impregnation tank 310. In the description below, the fiber bundle 705 impregnated with the thermosetting epoxy resin is called "resin-impregnated fiber bundle 710". The film thickness measurement device 320 is configured to measure the thickness of the thermosetting epoxy resin of the resin-impregnated fiber bundle 710.

The guide assembly 40 is configured to guide the resin-impregnated fiber bundle 701 to the outer surface of the liner 70. The guide assembly 40 includes an alignment port 400, a feed roller 410, a position adjuster 420 and an image acquirer 460. The alignment port 400 is configured to align the respective fibers included in the resin-impregnated fiber bundle 710 in a width direction of rollers of the position adjuster 420, i.e., in a direction (Z-axis direction) perpendicular to the conveying direction of the resin-impregnated fiber bundle 710. The feed roller 410 is configured to convey the resin-impregnated fiber bundle 710 to the position adjuster 420.

Figure 2:
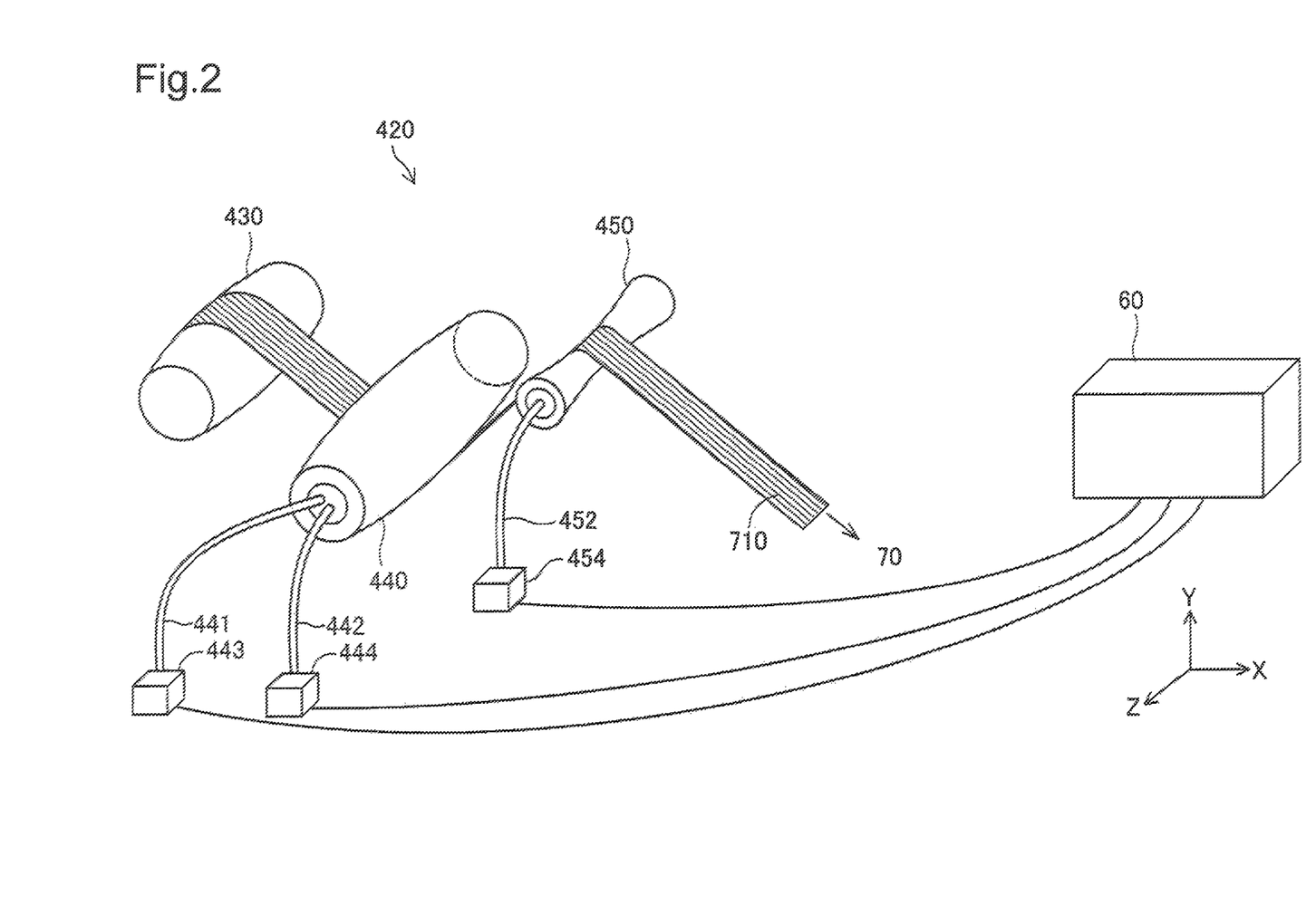
FIG. 2 is a perspective view illustrating the configuration of a position adjuster.

FIG. 2 is a perspective view illustrating the configuration of the position adjuster 420. XYZ axes in FIG. 2 and subsequent drawings indicate the same directions as those of the XYZ axes shown in FIG. 1. The position adjuster 420 includes a first roller 430, a second roller 440 and a third roller 450. The first roller 430 is in a convex shape having an expanded-diameter middle part in the width direction of the roller (Z-axis direction). The first roller 430 is configured to feed the resin-impregnated fiber bundle 710 fed by the feed roller 410 (shown in FIG. 1) to the second roller 440 while making the resin-impregnated fiber bundle 710 in contact with its upper surface in the vertical direction (Y-axis direction).

The second roller 440 is in a convex shape having an expanded-diameter middle part in the width direction of the roller (Z-axis direction). The second roller 440 is configured to feed the resin-impregnated fiber bundle 710 fed by the first roller 430 to the third roller 450 while making the resin-impregnated fiber bundle 710 in contact with its lower surface in the vertical direction (Y-axis direction). The second roller 440 is connected with an air compressor 443 by a first air piping 441 and is connected with a vacuum pump 444 by a second air piping 442. The first air piping 441 and the air compressor 443 cooperate with the controller 60 to serve as "ejection unit". The second air piping 442 and the vacuum pump 444 cooperate with the controller 60 to serve as "suction unit". The functions of the air compressor 443 and the vacuum pump 444 will be described later.

The third roller 450 is in a concave shape having a reduced-diameter middle part in the width direction of the roller (Z-axis direction). The third roller 450 is configured to guide the resin-impregnated fiber bundle 710 fed by the second roller 440 to the liner 70 while making the resin-impregnated fiber bundle 710 in contact with its upper surface in the vertical direction (Y-axis direction). The third roller 450 is connected with a vacuum pump 454 by an air piping 452. The air piping 452 and the vacuum pump 454 cooperate with the controller 60 to serve as "suction unit". The functions of the vacuum pump 454 will be described later.

As shown in FIG. 2, the first roller 430 and the second roller 440 are arranged at different heights in the vertical direction (Y-axis direction). The first roller 430 and the second roller 440 accordingly apply a tensile force to the resin-impregnated fiber bundle 710 held between these two rollers 430 and 440. Similarly the second roller 440 and the third roller 450 are arranged at different heights in the vertical direction (Y-axis direction). The second roller 440 and the third roller 450 accordingly apply a tensile force to the resin-impregnated fiber bundle 710 held between these two rollers 440 and 450. According to this embodiment, the first roller 430 and the third roller 450 are arranged at the same height.

As described above, the first to the third rollers 430, 440 and 450 guide the resin-impregnated fiber bundle 710 to the outer surface of the liner 70, while making the resin-impregnated fiber bundle 710 in contact with the respective rollers alternately to apply the tensile force to the resin-impregnated fiber bundle 710. The first to the third rollers 430, 440 and 450 are mounted to a support 422 (shown in FIG. 3) by means of shafts and are thus not rotated themselves by the contact of the resin-impregnated fiber bundle 710.

As shown in FIG. 1, the image acquirer 460 obtains an image of the position adjuster 420. The image acquirer 460 is a visible light camera placed at a position that photographs at least the second roller 440 and the third roller 450 of the position adjuster 420. The image acquirer 460 is configured to obtain an image of the second roller 440, the third roller 450 and the resin-impregnated fiber bundle 710 around both the rollers 440 and 450 by photographing and send the obtained image to the controller 60. The image acquirer 460 is a component used in a second embodiment. The details of the image acquirer 460 will be described in the second embodiment.

The liner rotating device 50 is configured to rotate the liner 70 while holding the liner 70. The liner 70 is a container in an elliptical cylindrical shape made of, for example, a high-intensity aluminum material or stainless steel material or a resin material (for example, hard plastic material) having gas barrier property to hydrogen. The liner rotating device 50 is configured to hold a mouthpiece provided at an end in the longitudinal direction (Y-axis direction) of the liner 70 and rotate the liner 70 around the longitudinal axis by a driving mechanism.

The controller 60 controls the respective parts of the filament winding apparatus 10. More specifically, the controller 60 performs controls a1 to a7 described below. The controls a3 to a7 may be omitted as appropriate.
(a1) The controller 60 controls power-on and power-off of the air compressor 443;
(a2) The controller 60 controls power-on and power-off of the vacuum pumps 444 and 454;
(a3) The controller 60 controls the ejection force of the air from the air compressor 443;
(a4) The controller 60 controls the suction forces of the outside air by the vacuum pumps 444 and 454;
(a5) The controller 60 controls the rotation speed of the liner 70 by the liner rotating device 50;
(a6) The controller 60 obtains the thickness of the thermosetting epoxy resin of the resin impregnated fiber bundle 710 from the film thickness measurement device 320; and
(a7) The controller 60 controls the temperature of the resin impregnation tank 310 based on the thickness of the thermosetting epoxy resin of the resin-impregnated fiber bundle 710, so as to provide the uniform thickness of the thermosetting epoxy resin of the resin-impregnated fiber bundle 710.

The filament winding apparatus 10 having the above configuration causes the plurality of carbon fibers 700 fed from the fiber feeder 20 to be impregnated with the epoxy resin in the resin impregnation assembly 30 and thereby provides the resin-impregnated fiber bundle 710. The resin-impregnated fiber bundle 710 has its end fixed to a winding start area of the liner 70. The resin-impregnated fiber bundle 710 is guided to the outer surface of the liner 70 by the guide assembly 40 and is wound on the outer periphery of the liner 70 by the rotation of the liner 70. The filament winding apparatus 10 accordingly winds the resin-impregnated fiber bundle 710 on the liner 70. The liner 70 with the resin-impregnated fiber bundle 710 wound thereon is subjected to thermosetting treatment to cure the epoxy resin, so that a high-pressure tank is manufactured as a fiber-reinforced resin composite product.

The winding method of the resin-impregnated fiber bundle 710 employed by the filament winding apparatus 10 of the embodiment may be either hoop winding or helical winding or both hoop winding and helical winding.

The "hoop winding" denotes a winding technique that winds the resin-impregnated fiber bundle 710 at approximately right angles to the longitudinal direction of the liner 70 (Y-axis direction) to cover a main body portion of the liner 70. In the course of hoop winding, the guide assembly 40 moves around the liner 70. The hoop winding enhances the intensity in the radial direction of the liner 70.

The "helical winding" denotes a winding technique that winds the resin-impregnated fiber bundle 710 at predetermined angles to the longitudinal direction of the liner 70 (Y-axis direction) to cover the main body portion and curved portions on respective ends of the liner 70. In the course of helical winding, the guide assembly 40 rotates while moving around the liner 70. The helical winding enhances the intensity in the longitudinal direction of the liner 70. FIG. 1 illustrates an example of helical winding on the liner 70.

A-2. Configuration of Position Adjuster

Figure 3:
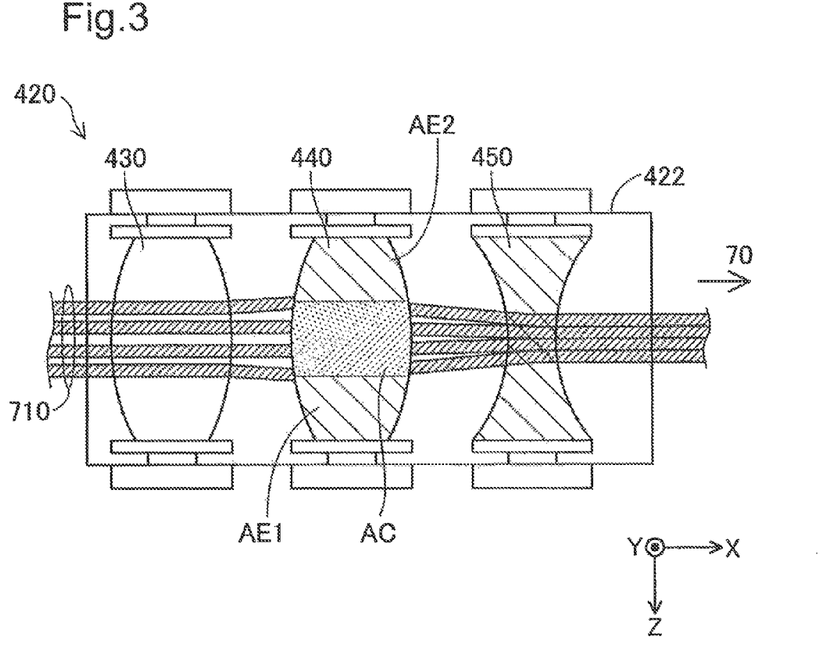
FIG. 3 is a plane view illustrating the configuration of the position adjuster.
Figure 4:
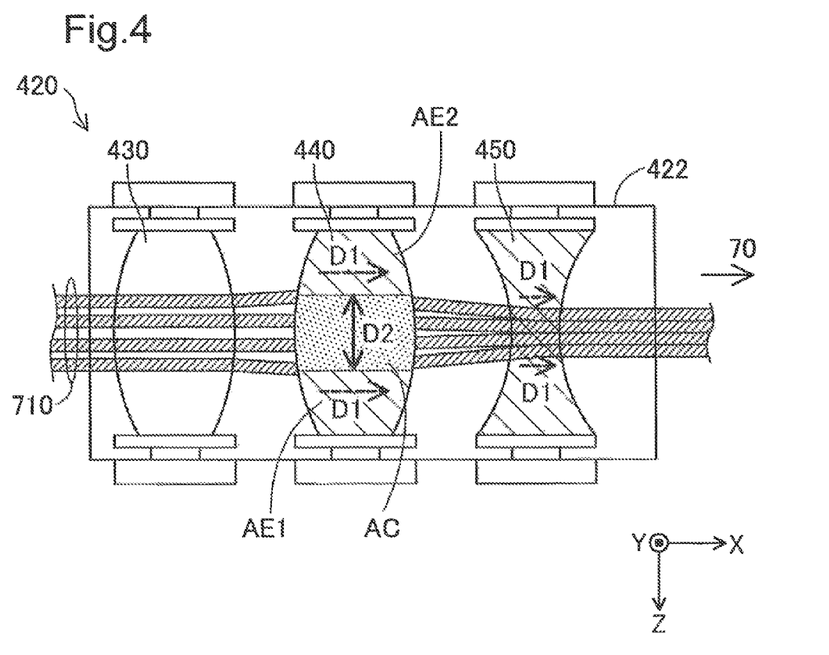
FIG. 4 is a diagram illustrating controlling the position of a fiber bundle by the position adjuster.

FIG. 3 is a plan view illustrating the configuration of the position adjuster 420. FIG. 4 is a diagram illustrating controlling the position of the fiber bundle by the position adjuster 420. As shown in FIG. 3, the first to the third rollers 430, 440 and 450 are respectively mounted to the support 422 by means of the shafts.

A-2-1. Second Roller (Expanded-Diameter Roller)

According to this embodiment, the second roller 440 is made of a porous material such as porous metal and has a large number of pores. The inner space of the second roller 440 is divided into three areas AC, AE1 and AE2 in the width direction of the second roller 440 (Z-axis direction):
    area AC located in the center;
    area AE1 located on the right side when viewed along the conveying direction of the resin-impregnated fiber bundle 710 (X-axis direction); and
    area AE2 located on the left side when viewed along the conveying direction of the resin-impregnated fiber bundle 710 (X-axis direction).

The inner space of the area AC is connected with the air compressor 443 (shown in FIG. 2) by the first air piping 441. The controller 60 drives the air compressor 443 to feed the air into the inner space of the area AC. The air fed by the air compressor 443 may be at ordinary temperature or may be temperature controlled. The air fed by the air compressor 443 is ejected from the pores in the area AC toward all directions on the outer surface of the second roller 440. The controller 60 controls the air compressor 443 to adjust the ejection force of the air ejected toward the outer surface of the second roller 440 to such an ejection force that spreads the respective fibers included in the resin-impregnated fiber bundle 710 in the width direction of the second roller 440 (Z-axis direction).

In the air ejected toward all the directions on the outer surface of the second roller 440, the air ejected toward the resin-impregnated fiber bundle 710 that is in contact with the second roller 440 passes through between the respective fibers included in the resin-impregnated fiber bundle 710. As a result, as shown in FIG. 4, the width of the resin-impregnated fiber bundle 710 in the area AC is expanded in a width direction D2 of the second roller 440 (Z-axis direction), so that the expanded resin-impregnated fiber bundle 710 is provided in the downstream of the second roller 440. The pores in the area AC serve as "ejection holes".

The inner spaces of the areas AE1 and AE2 are connected with the vacuum pump 444 (shown in FIG. 2) by the second air piping 442. The controller 60 drives the vacuum pump 444 to suck the air from the respective inner spaces of the areas AE1 and AE2 and discharge the sucked air to outside. The pressure levels in the inner spaces of the areas AE1 and AE2 accordingly become lower than the atmospheric pressure, so that the outside air flows from all the directions on the outer surface of the second roller 440 through the pores in the areas AE1 and AE2 into the inner spaces of the areas AE1 and AE2. The controller 60 controls the vacuum pump 444 to adjust the suction force by the outside air flowing from the outer surface of the second roller 440 into the inner spaces to such a suction force that draws the resin-impregnated fiber bundle 710 toward the second roller 440 (Y-axis direction).

In the outside air flowing from all the directions on the outer surface of the second roller 440 into the inner spaces, the outside air near to the resin-impregnated fiber bundle 710 that is in contact with the second roller 440 draws the respective fibers included in the resin-impregnated fiber bundle 710 toward the outer surface of the second roller 440. As a result, as shown in FIG. 4, drawing the resin-impregnated fiber bundle 710 in the areas AE1 and AE2 toward the outer surface of the second roller 440 increases the friction between the resin-impregnated fiber bundle 710 and the second roller 440. The resin-impregnated fiber bundle 710 is accordingly conveyed in a conveying direction D1 of the fiber bundle (X-axis direction) in the state that the positions of the resin-impregnated fiber bundle 710 are kept in the radial direction (Y-axis direction) and in the width direction (Z-axis direction) of the second roller 440. The pores in the area AE1 serve as "first suction holes", and the pores in the area AE2 serve as "second suction holes". The first suction holes and the second-suction holes are collectively called "suction holes".

The second roller 440 may not be necessarily made of the porous material. The second roller 440 may have any modified configuration that has suction holes on at least a surface that is in contact with the resin-impregnated fiber bundle 710, for example, any of modified configurations b1 to b4 given below:

(b1) a modified configuration that the porous material is used for only the surface that is in contact with the resin-impregnated fiber bundle 710 in the configuration of the above embodiment and a metal, a resin, a ceramic material or the like without pores is used for the other surfaces;

(b2) a modified configuration that either one of the area AE1 and the area AE2 is omitted from the configuration of the above embodiment;

(b3) a configuration that a metal, a resin, a ceramic material or the like without pores is used as the material of the second roller 440 and pores or slits serving as suction holes are provided separately; and (b4) a modification of the configuration b3 that pores or slits are provided only in the surface that is in contact with the resin-impregnated fiber bundle 710.

As described above, in the second roller 440 of this embodiment, the air is ejected from the ejection holes (pores in the area AC) provided in the surface that is in contact with the resin-impregnated fiber bundle 710 with the ejection force that allows the respective fibers included in the resin-impregnated fiber bundle 710 in contact with the second roller 440 to be spread in the width direction of the second roller 440 (Z-axis direction). The second roller 440 may thus serve as "expansion roller" that expands the width of the resin-impregnated fiber bundle 710 guided to the outer surface of the liner 70. In the second roller 440 of this embodiment, in the area AC at the center in the width direction (Z-axis direction), the width of the resin-impregnated fiber bundle 710 guided to the outer surface of the liner 70 may be expanded by the air ejected from the ejection holes. In the areas AE1 and AE2 at the respective ends in the width direction, the position of the resin-impregnated fiber bundle 710 on the second roller 440 in the guide assembly 40 may be controlled by the outside air sucked from the first suction holes and the second suction holes. As a result, the filament winding apparatus 10 of this embodiment can effectively use the width of the second roller 440 to achieve both the control of the position of the resin-impregnated fiber bundle 710 and the expansion of the width of the resin-impregnated fiber bundle 710.

A-2-2. Third Roller (Position Control Roller)

According to this embodiment, the third roller 450 is made of a porous material such as porous metal and has a large number of pores. The inner space of the third roller 450 is connected with the vacuum pump 454 (shown in FIG. 2) by the air piping 452. The controller 60 drives the vacuum pump 454 to suck the air from the inner space of the third roller 450 and discharge the sucked air to outside. The pressure level in the inner space of the third roller 450 accordingly becomes lower than the atmospheric pressure, so that the outside air flows from all directions on the outer surface of the third roller 450 through the pores in the third roller 450 into the inner space of the third roller 450. The controller 60 controls the vacuum pump 454 to adjust the suction force by the outside air flowing from the outer surface of the third roller 450 into the inner space to such a suction force that draws the resin-impregnated fiber bundle 710 toward the third roller 450 (Y-axis direction).

In the outside air flowing from all the directions on the outer surface of the third roller 450 into the inner space, the outside air near to the resin-impregnated fiber bundle 710 that is in contact with the third roller 450 draws the respective fibers included in the resin-impregnated fiber bundle 710 toward the outer surface of the third roller 450. As a result, as shown in FIG. 4, drawing the resin-impregnated fiber bundle 710 toward the outer surface of the third roller 450 increases the friction between the resin-impregnated fiber bundle 710 and the third roller 450. The resin-impregnated fiber bundle 710 is accordingly conveyed in the conveying direction D1 of the fiber bundle (X-axis direction) in the state that the positions of the resin-impregnated fiber bundle 710 are kept in the radial direction (Y-axis direction) and in the width direction (Z-axis direction) of the third roller 450. The pores of the third roller 450 serve as "suction holes".

The third roller 450 may not be necessarily made of the porous material. The third roller 450 may have any modified configuration that has suction holes on at least a surface that is in contact with the resin-impregnated fiber bundle 710, for example, any of modified configurations c1 to c3 given below:

(c1) a modified configuration that the porous material is used for only the surface that is in contact with the resin-impregnated fiber bundle 710 in the configuration of the above embodiment and a metal, a resin, a ceramic material or the like without pores is used for the other surfaces;

(c2) a configuration that a metal, a resin, a ceramic material or the like without pores is used as the material of the third roller 450 and pores or slits serving as suction holes are provided separately; and (c3) a modification of the configuration c2 that pores or slits are provided only in the surface that is in contact with the resin-impregnated fiber bundle 710.

As described above, the third roller 450 of this embodiment is in the concave shape having the reduced-diameter middle part in the width direction (Z-axis direction). The third roller 450 may thus serve as "position control roller" that converges the resin-impregnated fiber bundle 710 guided to the outer surface of the liner 70, in the middle part. The third roller 450 of this embodiment has the suction holes provided in the middle part in the width direction to suck the outside air. Drawing the resin-impregnated fiber bundle 710 converged in the middle part toward the third roller 450 suppresses positional misalignment of the resin-impregnated fiber bundle 710 in both the radial direction (Y-axis direction) and the width direction of the third roller 450, while keeping the position of the resin-impregnated fiber bundle 710 in the middle part of the third roller 450. As a result, the filament winding apparatus 10 of this embodiment can converge the resin-impregnated fiber bundle 710 guided to the outer surface of the liner 70 while controlling the position of the resin-impregnated fiber bundle 710 on the third roller 450 of the guide assembly 40. The angle of the resin-impregnated fiber bundle 710 between upstream and downstream of the third roller 450 is preferably less than 180 degrees.

As described above, in the filament winding apparatus 10 of the first embodiment, each of the rollers that guide the resin-impregnated fiber bundle 710 to the outer surface of the liner 70 (i.e., second roller 440 and third roller 450) sucks the outside air from the suction holes provided in the surface that is in contact with the resin-impregnated fiber bundle 710 (i.e., the pores in the areas AE1 and AE2 in the second roller 440 and the pores in the third roller 450) with the suction force that draws the resin-impregnated fiber bundle 710 in contact with each roller. Each of the second roller 440 and the third roller 450 draws the resin-impregnated fiber bundle 710 in contact with each roller, toward each roller. This configuration suppresses positional misalignment in both the Y-axis direction and the Z-axis direction of the resin-impregnated fiber bundle 710, while keeping the position of the resin-impregnated fiber bundle 710. As a result, the filament winding apparatus 10 can control the position of the resin-impregnated fiber bundle 710 on each of the rollers of the guide assembly 40 (i.e., second roller 440 and third roller 450).

In the filament winding apparatus 10 of the first embodiment, the second roller 440 uniformly expands the width of the resin-impregnated fiber bundle 710, so that the thickness of the resin-impregnated fiber bundle 710 (in the Y-axis direction) is uniformly reduced. Uniformly thinned resin-impregnated fiber bundle 710 is unlikely to cause unevenness even when the resin-impregnated fiber bundle 710 is wound in multiple layers on the liner 70. This configuration further enhances the intensity of the high-pressure tank obtained after the thermosetting treatment and stabilizes the quality of the high-pressure tank. In the filament winding apparatus 10 of the first embodiment, the third roller 450 converges the respective fibers included in the resin-impregnated fiber bundle 710. This configuration reduces the gap between the respective fibers of the resin-impregnated fiber bundle 710. The resin-impregnated fiber bundle 710 having the reduced gaps has a uniform contact pressure when being wound on the liner 70. This configuration further enhances the intensity of the high-pressure tank obtained after the thermosetting treatment and stabilizes the quality of the high-pressure tank. Additionally, the control of the position of, the expansion of the width of and the convergence of the resin-impregnated fiber bundle 710 by using the second roller 440 and the third roller 450 are achieved in the series of winding process in the filament winding apparatus 10. This is unlikely to reduce the productivity.

Additionally, the second roller 440 and the third roller 450 guide the resin-impregnated fiber bundle 710 that is impregnated with the thermosetting resin, to the liner 70, while making the resin-impregnated fiber bundle 710 in contact with the respective rollers 440 and 450. The suction holes of the second roller 440 and the third roller 450 are thus likely to be clogged by the thermosetting resin. In the filament winding apparatus 10 of the first embodiment, however, the suction holes of the respective rollers (i.e., second roller 440 and third roller 450) are pores of the porous material. This configuration suppresses the suction holes from being clogged by the thermosetting resin.

B. Second Embodiment

A second embodiment of the invention describes a configuration that detects misalignment of a fiber bundle or the like and performs feedback control. The configuration and the procedure similar to those of the first embodiment are expressed by the like signs to those of the first embodiment described above, and their detailed descriptions are omitted. In other words, the configuration and the procedure that are not described below are similar to those of the first embodiment described above.

B-1. Configuration of Filament Winding Apparatus

A filament winding apparatus 10 according to the second embodiment has configuration substantially similar to that of the first embodiment shown in FIG. 1. The filament winding apparatus 10 of the second embodiment, however, differs from the first embodiment shown in FIG. 1 by that the filament winding apparatus 10 of the second embodiment has a position adjuster 420a in place of the position adjuster 420 and the controller 60 performs different controls.

B-2. Configuration of Position Adjuster

Figure 5:
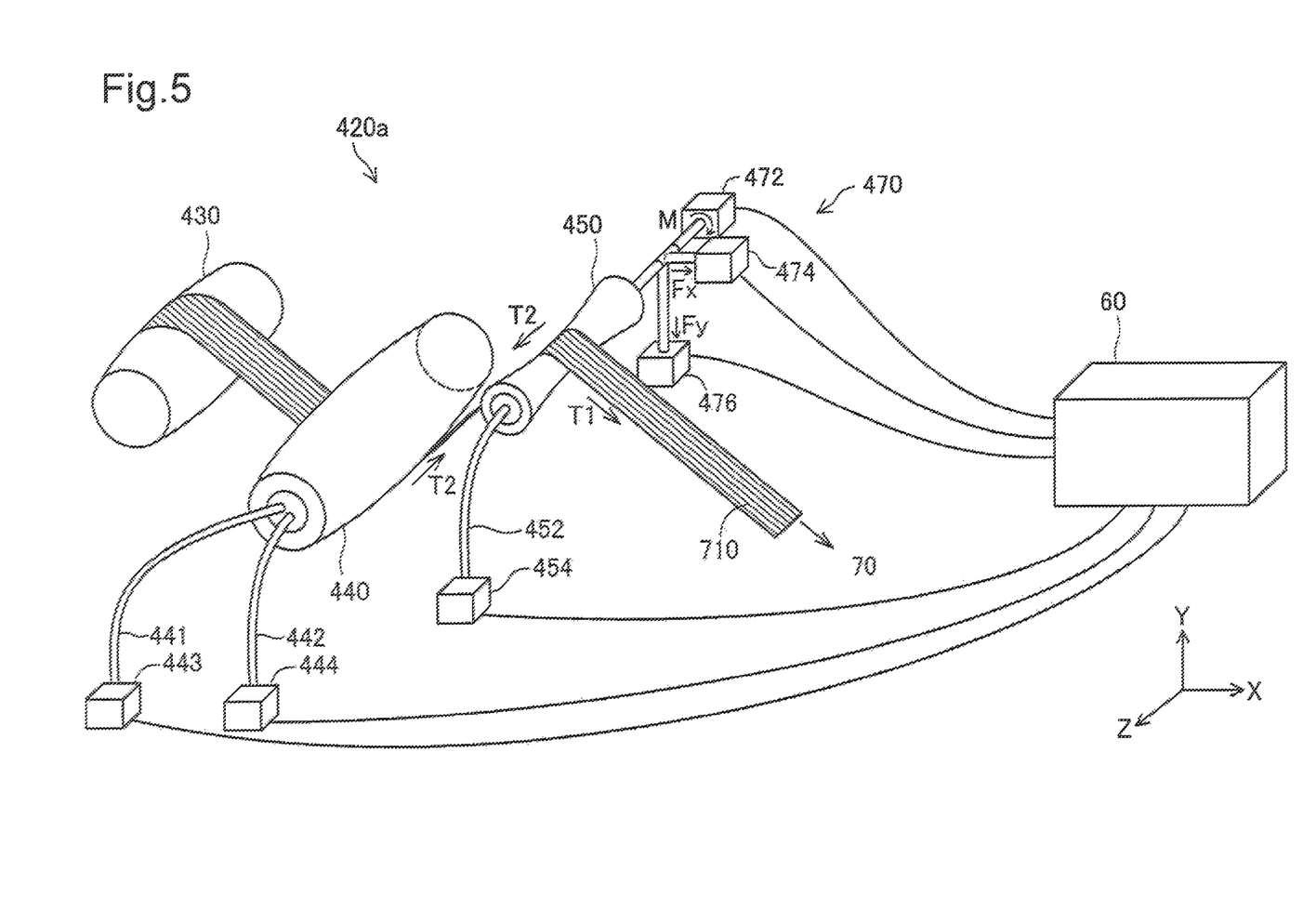
FIG. 5 is a perspective view illustrating the configuration of a position adjuster according to a second embodiment.

FIG. 5 is a perspective view illustrating the configuration of the position adjuster 420a according to the second embodiment. The position adjuster 420a differs from the first embodiment shown in FIG. 2 by that the position adjuster 420a additionally includes a load measurement unit 470, but otherwise has similar configuration to that of the first embodiment. The load measurement unit 470 cooperates with the controller 60 in feedback control described below to detect a tensile force T1 of the resin-impregnated fiber bundle 710 between the liner 70 and the third roller 450. The load measurement unit 470 includes a torque measurement unit 472, a horizontal direction load measurement unit 474 and a vertical direction load measurement unit 476. The torque measurement unit 472 measures a friction torque M applied to the third roller 450 and sends the measurement value to the controller 60. The horizontal direction load measurement unit 474 measures a horizontal direction load Fx applied to the third roller 450 and sends the measurement value to the controller 60. The vertical direction load measurement unit 476 measures a vertical direction load Fy applied to the third roller 450 and sends the measurement value to the controller 60.

B-3. Feedback Control

The controller 60 of this embodiment performs at least part of controls a8 to a12 described below as feedback controls, in addition to the controls a1 to a7 described above:
(a8) The controller 60 detects positional misalignment of the resin-impregnated fiber bundle 710 on the second roller 440;
(a9) The controller 60 detects positional misalignment of the resin-impregnated fiber bundle 710 on the third roller 450;
(a10) The controller 60 detects the tensile force of the resin-impregnated fiber bundle 710 between the third roller 450 and the liner 70;
(a11) The controller 60 uses at least part of the information detected in the controls a8 to a10 to determine whether suction is to be performed by the second roller 440 and by the third roller 450 or to change the suction force from the suction holes; and
(a12) The controller 60 uses at least part of the information detected in the controls a8 to a10 to determine whether ejection is to be performed by the second roller 440 or to change the ejection force from the ejection holes.

B-3-1. Method of Detecting Positional Misalignment

The following describes the method of detecting positional misalignments (control a8 and control a9). The controller 60 uses the image obtained from the image acquirer 460 to respectively detect a positional misalignment of the resin-impregnated fiber bundle 710 on the second roller 440 and a positional misalignment of the resin-impregnated fiber bundle 710 on the third roller 450. The "positional misalignment" detected by the controller 60 may include both or either one of misalignment of the position of the resin-impregnated fiber bundle 710 from a predetermined position in the radial direction of the roller (Y-axis direction) and misalignment of the position of the resin-impregnated fiber bundle 710 from a predetermined position in the width direction of the roller (Z-axis direction).

The controller 60 compares an image of the position adjuster 420a in the state without any positional misalignment (hereinafter referred to as "reference image") and the image obtained from the image acquirer 460 and obtains a difference in position of the resin-impregnated fiber bundle 710 between these two images. The controller 60 determines that there is a positional misalignment when the obtained difference in position is equal to or greater than a predetermined magnitude, while determining that there is no positional misalignment when the obtained difference in position is less than the predetermined magnitude. The controller 60 also regards the obtained difference in position as "amount of misalignment". The controller 60 cooperates with the image acquirer 460 in this way to serve as "misalignment detector". The predetermined magnitude may be determined arbitrarily. The reference image may be stored in advance in the controller 60 or may be obtained from an external memory.

B-3-2. Method of Detecting Tensile Force

The following describes the method of detecting the tensile force (control a10). The controller 60 uses the horizontal direction load Fx, the vertical direction load Fy and the friction torque M obtained from the load measurement unit 470 to detect the tensile force T1 of the resin-impregnated fiber bundle 710 between the liner 70 and the third roller 450. In the description below, the tensile force of the resin-impregnated fiber bundle 710 between the liner 70 and the third roller 450 is called tensile force T1, and the tensile force of the resin-impregnated fiber bundle 710 between the third roller 450 and the second roller 440 is called tensile force T2.

Figure 6:
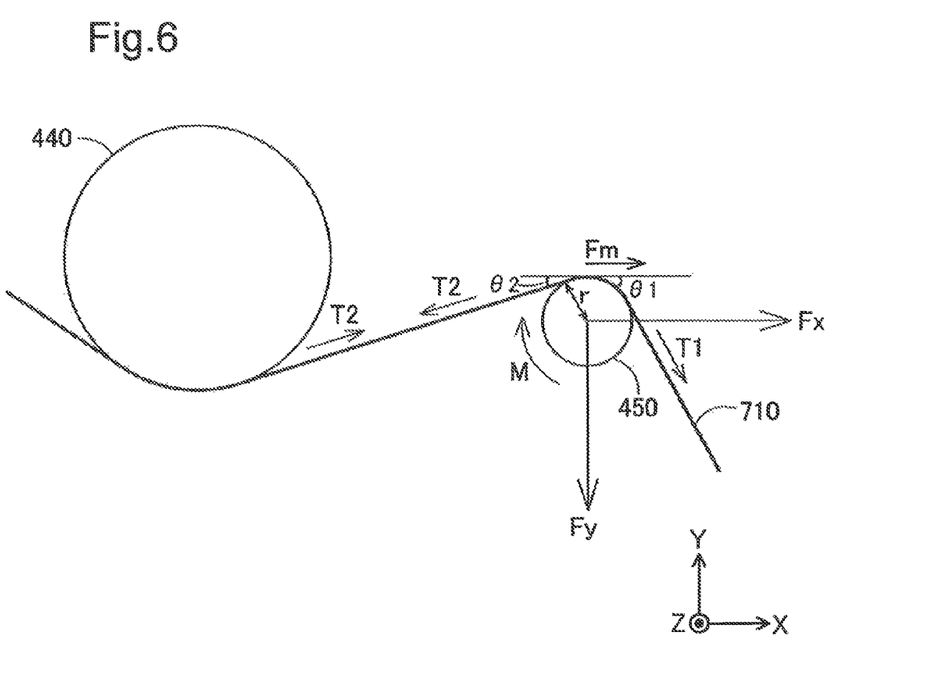
FIG. 6 is a diagram illustrating a method of detecting a tensile force.

FIG. 6 is a diagram illustrating the method of detecting the tensile force. The controller 60 uses Equation 1 given below to calculate a rotating direction load Fm applied to the third roller 450 from the friction torque M obtained from the torque measurement unit 472. In Equation 1, r represents the diameter of the third roller 450:

$$Fm = M/r \tag{1}$$

The angle of the resin-impregnated fiber bundle 710 between the liner 70 and the third roller 450 to the horizontal direction is expressed as an outlet angle $\theta 1$. The angle of the resin-impregnated fiber bundle 710 between the third roller 450 and the second roller 440 to the horizontal direction is expressed as an inlet angle $\theta 2$. The inlet angle $\theta 2$ is determined unequivocally according to the positional relationship between the second roller 440 and the third roller 450. Equations 2 to 4 given below are provided with regard to the horizontal direction load Fx, the vertical direction load Fy, the rotating direction load Fm, the outlet angle $\theta 1$, the inlet angle $\theta 2$, the tensile force T1 and the tensile force T2, and Equation 5 is led from Equations 2 to 4:

$$Fx = T1 \cos \theta 1 + T2 \cos \theta 2 \tag{2}$$

$$Fy = T1 \sin \theta 1 + T2 \sin \theta 2 \tag{3}$$

$$T1 = T2 + Fm \tag{4}$$

$$T1 = \{Fx2 + Fy2 - 2 \times Fm(Fx \cos \theta 2 - Fy \sin \theta 2) + Fm2\}/- 2(Fx \cos \theta 2 - Fy \sin \theta 2 - Fm) \tag{5}$$

The controller 60 uses Equation 5 given above to calculate the tensile force T1 based on the rotating direction load Fm calculated according to Equation 1, the horizontal direction load Fx obtained from the horizontal direction load measurement unit 474 and the vertical direction load Fy obtained from the vertical direction load measurement unit 476. The inlet angle $\theta 2$ is a known value that is determined unequivocally according to the positional relationship between the second roller 440 and the third roller 450. The controller 60 cooperates with the load measurement unit 470 in this way to serve as "tensile force detector".

B-3-3. Settings of Feedback

The following describes the settings of feedback (controls a11 and a12). The controller 60 changes items d1 to d6 given below, based on at least part of the positional misalignment on the second roller 440, the positional misalignment on the third roller 450 and the tensile force between the liner 70 and the third roller 450 detected as described above, as conditions. The controller 60 may change all the items d1 to d6 or may change any combination of at least part of the items d1 to d6:

(d1) whether suction is to be performed by the second roller 440;
(d2) magnitude of the suction force in the case where suction is performed by the second roller 440;
(d3) whether suction is to be performed by the third roller 450;
(d4) magnitude of the suction force in the case where suction is performed by the third roller 450;
(d5) whether ejection is to be performed by the second roller 440; and
(d6) magnitude of the ejection force in the case where ejection is performed by the second roller 440.

Figure 7:
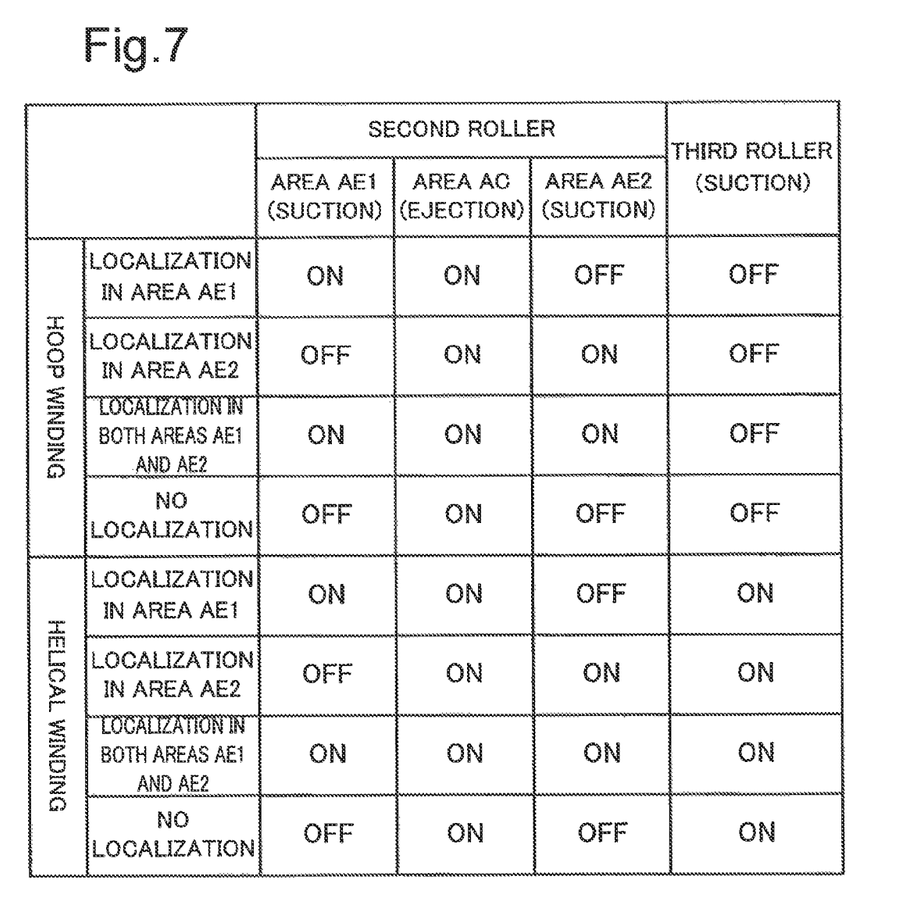
FIG. 7 is a diagram illustrating one example of setting of feedback.

FIG. 7 is a diagram illustrating one example of the settings of feedback. FIG. 7 shows an example that changes the combination of the items d1 and d3 based on the positional misalignment on the second roller 440 and the fiber winding technique employed in the filament winding apparatus 10 as conditions.

According to the settings of FIG. 7, in the case of hoop winding of the resin-impregnated fiber bundle 710, when localization of the resin-impregnated fiber bundle 710 (positional misalignment) is detected in the area AE1 of the second roller 440, the controller 60 performs suction in the area AE1, performs ejection in the area AC and does not perform suction in the area AE2 with regard to the second roller 440, and does not perform suction with regard to the third roller 450. In the case of hoop winding of the resin-impregnated fiber bundle 710, when localization of the resin-impregnated fiber bundle 710 is detected in the area AE2 of the second roller 440, the controller 60 does not perform suction in the area AE1, performs ejection in the area AC and performs suction in the area AE2 with regard to the second roller 440, and does not perform suction with regard to the third roller 450. In the case of hoop winding of the resin-impregnated fiber bundle 710, when localization of the resin-impregnated fiber bundle 710 is detected in both the areas AE1 and AE2 of the second roller 440, the controller 60 performs suction in the area AE1, performs ejection in the area AC, and performs suction in the area AE2 with regard to the second roller 440, and does not perform suction with regard to the third roller 450. In the case of hoop winding of the resin-impregnated fiber bundle 710, when no localization of the resin-impregnated fiber bundle 710 is detected in the second roller 440, the controller 60 does not perform suction in the area AE1, performs ejection in the area AC and does not perform suction in the area AE2 with regard to the second roller 440, and does not perform suction with regard to the third roller 450.

As described above, the controller 60 can determine whether suction is to be performed (or magnitude of the suction force) in each area of the second roller 440 where a positional misalignment of the resin-impregnated fiber bundle 710 is detected. This configuration does not perform suction in the area where no positional misalignment is detected. This saves the energy for driving the vacuum pump and reduces the power consumption of the filament winding apparatus 10.

According to the settings of FIG. 7, in the case of helical winding of the resin-impregnated fiber bundle 710, the controller 60 performs the same controls as those in the case of hoop winding with regard to the second roller 440. More specifically, the controller 60 changes execution or non-execution of suction in each area according to localization (positional misalignment) of the resin-impregnated fiber bundle 710 on the second roller 440. In the case of helical winding of the resin-impregnated fiber bundle 710, the controller 60, however, performs suction with regard to the third roller 450, irrespective of the presence or the non-presence of positional misalignment on the second roller 440.

As described above, the controller 60 can determine whether suction is to be performed (or magnitude of the suction force) with regard to the third roller 450 according to each fiber winding technique employed in the filament winding apparatus 10. In the case of hoop winding, the guide assembly 40 only moves around the liner 70. In the case of helical winding, on the other hand, the guide assembly 40 rotates while moving around the liner 70. Accordingly, the helical winding is more likely to cause a positional misalignment of the resin-impregnated fiber bundle 710, compared with the hoop winding. The above configuration does not perform suction in the case of hoop winding that is relatively unlikely to cause a positional misalignment. This saves the energy for driving the vacuum pump and reduces the power consumption of the filament winding apparatus 10.

FIG. 7 illustrates only one example of the settings of feedback. According to one modification, the controller 60 may perform suction and ejection irrespective of the presence or the non-presence of positional misalignment and change the magnitude of the suction force and the magnitude of the ejection force according to the amount of misalignment. According to another modification, the controller 60 may perform suction with regard to the third roller 450 irrespective of the fiber winding technique employed in the filament winding apparatus 10. According to another modification, the controller 60 may change the magnitude of the suction force in the second roller 440 and the magnitude of the suction force in the third roller 450 according to the fiber winding technique employed in the filament winding apparatus 10. According to another modification, when the detected tensile force becomes equal to or higher than a predetermined value, the controller 60 may determine that the ejection force in the second roller 440 is too high and decrease the ejection force (or stop the ejection) in the second roller 440.

As described above, in the filament winding apparatus 10 of the second embodiment, the suction unit (the controller 60, the second air piping 442 and the vacuum pump 444 for the second roller 440, and the controller 60, the air piping 452 and the vacuum pump 454 for the third roller 450) changes at least one of the determination of whether suction is to be performed and the magnitude of the suction force according to the positional misalignment of the resin-impregnated fiber bundle 710. In the case where the resin-impregnated fiber bundle 710 has no positional misalignment, the suction unit may not perform suction or may reduce the magnitude of the suction force. In the case where the resin-impregnated fiber bundle 710 has a significant positional misalignment, on the other hand, the suction unit may perform suction or may increase the magnitude of the suction force. As a result, the filament winding apparatus 10 can automatically perform feedback control of the position of the resin-impregnated fiber bundle 710 on each roller of the guide assembly 40 (i.e., second roller 440 and third roller 450) according to the actual positional misalignment of the resin-impregnated fiber bundle 710.

In the filament winding apparatus 10 of the second embodiment, the suction unit (the controller 60, the second air piping 442 and the vacuum pump 444 for the second roller 440, and the controller 60, the air piping 452 and the vacuum pump 454 for the third roller 450) changes at least one of the determination of whether suction is to be performed and the magnitude of the suction force according to the winding technique of the resin-impregnated fiber bundle 710 on the liner 710. In the case of hoop winding that is unlikely to cause a positional misalignment of the resin-impregnated fiber bundle 710, the suction unit may not perform suction or may reduce the magnitude of the suction force. In the case of helical winding that is likely to cause a positional misalignment of the resin-impregnated fiber bundle 710, on the other hand, the suction unit may perform suction or may increase the magnitude of the suction force. As a result, the filament winding apparatus 10 can automatically perform feedback control of the position of the resin-impregnated fiber bundle 710 on each roller of the guide assembly 40 (i.e., second roller 440 and third roller 450) according to the winding technique of the resin-impregnated fiber bundle 710.

C. Modifications

The invention is not limited to any of the aspects and the embodiments described above but may be implemented by a diversity of other configurations without departing from the scope of the invention. For example, part or all of the functions and the processes implemented by the software in the above embodiments may be implemented by hardware. Part or all of the functions and the processes implemented by the hardware in the above embodiments may be implemented by software. The hardware may be any of various circuitries, for example, an integrated circuit, a discrete circuit or a circuit module as combination of these circuits. Some examples of possible modification are given below.

Modification 1

The above embodiment illustrates one example of the configuration of the filament winding apparatus. The configuration of the filament winding apparatus may, however, be changed or modified in any of various ways. For example, some components may be added, deleted or exchanged.

According to one modification, a prepreg impregnated with a resin may be used in place of the resin-impregnated fibers. The prepreg is a sheet-like member formed by impregnating carbon fibers with a resin (for example, epoxy resin). In the case where a prepreg is used, the resin impregnation tank may be omitted.

The number of bobbins in the filament winding apparatus is only illustrative and may be one or any plural number. Similarly, the number of feed rollers in the filament winding apparatus is only illustrative and may be one or any plural number.

The above embodiment describes the positional relationship of the respective parts, the method of detecting a positional misalignment and the method of detecting a tensile force in the state that the guide assembly is in a specific attitude. The terms "horizontal direction" and "vertical direction" in the description should be understood adequately according to the attitude of the guide assembly.

Modification 2

The above embodiment describes one example of the configuration of the guide assembly. The configuration of the guide assembly may, however, be changed or modified in any of various ways. For example, some components may be added, deleted or exchanged.

According to one modification, the position adjuster may include n (where n denotes an integral number of not less than 3) rollers as first to n-th rollers. The first roller may have the same configuration as that of the second roller or may have the same configuration as that of the third roller.

According to another modification, either one or both of the ejection holes and the suction holes may be omitted from the second roller. The arrangement of the ejection holes and the suction holes in the second roller (in other words, the arrangement of the areas AC, AE1 and AE2) may be changed arbitrarily. For example, an area without suction or ejection may be provided between the ejection holes and the suction holes in the second roller.

According to another modification, the suction holes may be omitted from the third roller. The suction holes of the third roller may be provided only in a middle part in the width direction of the third roller.

The misalignment detector may have a different configuration. In one configuration, a pressure sensor may be incorporated in place of the image acquirer, to detect the contact pressure of the resin-impregnated fiber bundle with respect to each of the second roller and the third roller. In this configuration, the controller analyzes the output values of the pressure sensor to detect a positional misalignment of the resin-impregnated fiber bundle on the second roller and a positional misalignment of the resin-impregnated fiber bundle on the third roller.

According to another modification, the misalignment detector and the tensile force detector may be omitted when they are not used for the conditions of feedback control.

Modification 3

The above embodiment shows one example of the feedback control. The details of the feedback control may, however, be changed or modified in any of various ways. For example, the conditions and the settings of feedback control may be added, deleted or exchanged.

According to one modification, feedback control may be performed using conditions other than those described above. The conditions employable other than those described above may include, for example, positional misalignment of the resin-impregnated fiber bundle on the first roller, localization of the fibers in the resin-impregnated fiber bundle, and the viscosity of the resin in the resin-impregnated fiber bundle.

Modification 4

The invention is not limited to any of the embodiments, the examples and the modifications described above but may be implemented by a diversity of other configurations without departing from the scope of the invention. For example, the technical features of any of the embodiments, examples and modifications corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential herein.

What is claimed is:

1. A filament winding apparatus that winds a fiber bundle consisting of a plurality of fibers on an outer surface of a liner, the filament winding apparatus comprising:
a fiber feeder configured to feed the fiber bundle; and
a guide assembly including a roller configured to guide the fiber bundle fed by the fiber feeder to the outer surface of the liner while making the fiber bundle in contact with the roller, wherein
the roller comprises:
a suction hole configured to suck the outside air, the suction hole being provided in at least a surface of the roller that is to be in contact with the fiber bundle;
a suction unit configured to suck the outside air from the suction hole with such a suction force that draws the fiber bundle in contact with the roller;
an ejection hole configured to eject the air, the ejection hole being provided in at least a surface of the roller that is in contact with the fiber bundle; and
an ejection unit configured to eject the air from the ejection hole with such an ejection force that spreads each of the fibers included in the fiber bundle in contact with the roller in a direction perpendicular to a conveying direction of the fiber bundle.

2. The filament winding apparatus according to claim 1, wherein the suction hole includes a first suction hole and a second suction hole,
the ejection hole is placed in a middle part of the roller in a width direction of the roller, and
the first suction hole and the second suction hole are placed on both ends of the ejection hole.

3. The filament winding apparatus according to claim 2, wherein the suction unit performs suction from the first suction hole or the second suction hole corresponding to a location where the fiber bundle has a misalignment or, increases the suction force from the first suction hole or the second suction hole corresponding to the location where the fiber bundle has the misalignment.

4. The filament winding apparatus according to claim 1, wherein the roller is in a concave shape having a reduced-diameter middle part of the roller in a width direction of the roller, and
the suction hole is placed in the middle part of the roller.

5. The filament winding apparatus according to claim 1, wherein the roller is made of a porous material, and
the suction hole includes pores of the porous material.

6. A control method of a filament winding apparatus,
the filament winding apparatus comprising a fiber feeder configured to feed a fiber bundle consisting of a plurality of fibers; and a guide assembly including a roller configured to guide the fiber bundle fed by the fiber feeder to an outer surface of a liner while making the fiber bundle in contact with the roller, wherein the roller comprises a suction hole configured to suck the outside air, the suction hole being provided in at least a surface of the roller that is in contact with the fiber bundle; a suction unit configured to suck the outside air from the suction hole with such a suction force that draws the fiber bundle in contact with the roller; an ejection hole configured to eject the air, the suction hole being provided in at least a surface of the roller that is in contact with the fiber bundle; and an ejection unit configured to eject the air from the ejection hole with such an ejection force that spreads each of the fibers included in the fiber bundle in contact with the roller in a direction perpendicular to a conveying direction of the fiber bundle,
the control method comprising
causing the suction unit to change at least one of determination of whether suction is to be performed and magnitude of the suction force according to a misalignment of the fiber bundle relative to a predetermined position.

7. The control method according to claim 6,
wherein the suction hole includes a first suction hole and a second suction hole,
the ejection hole is placed in a middle part of the roller in a width direction of the roller, and
the first suction hole and the second suction hole are placed on respective sides of the ejection hole,
the control method comprising either
causing the suction unit to perform suction from the first suction hole or the second suction hole corresponding to a location where the fiber bundle has a misalignment, or
causing the suction unit to increase the suction force from the first suction hole or the second suction hole corresponding to the location where the fiber bundle has the misalignment.

8. The control method according to claim 6,
wherein the roller is in a concave shape having a reduced-diameter middle part of the roller in a width direction of the roller, and
the suction hole is placed in the middle part of the roller,
the control method comprising
causing the suction unit to change at least one of determination of whether suction is to be performed and magnitude of the suction hole according to a winding technique of the fiber bundle on the liner.

9. The control method according to claim 6,
wherein the roller is made of a porous material, and
the suction hole includes pores of the porous material.

* * * * *